(12) United States Patent
Koo et al.

(10) Patent No.: US 10,770,230 B2
(45) Date of Patent: Sep. 8, 2020

(54) MULTILAYER CERAMIC CAPACITOR AND METHOD OF MANUFACTURING THE SAME

(71) Applicant: SAMSUNG ELECTRO-MECHANICS CO., LTD., Suwon-Si, Gyeonggi-Do (KR)

(72) Inventors: Kun Hoi Koo, Suwon-Si (KR); Bon Seok Koo, Suwon-Si (KR); Jung Min Kim, Suwon-Si (KR); Jun Hyeon Kim, Suwon-Si (KR); Hae Sol Kang, Suwon-Si (KR); Soung Jin Kim, Suwon-Si (KR); Ji Hye Han, Suwon-Si (KR); Byung Woo Kang, Suwon-Si (KR); Chang Hak Choi, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/972,860

(22) Filed: May 7, 2018

(65) Prior Publication Data

US 2019/0013150 A1    Jan. 10, 2019

(30) Foreign Application Priority Data

Jul. 4, 2017 (KR) .................... 10-2017-0084994
Sep. 26, 2017 (KR) .................... 10-2017-0124109

(51) Int. Cl.
*H01G 4/232*    (2006.01)
*H01G 4/30*    (2006.01)

(52) U.S. Cl.
CPC .............. *H01G 4/2325* (2013.01); *H01G 4/30* (2013.01)

(58) Field of Classification Search
CPC ...... H01G 4/248; H01G 4/012; H01G 4/1209; H01G 4/232; H01G 4/30; H01G 4/0085; H01G 4/1227; H01G 4/2325
(Continued)

(56) References Cited

U.S. PATENT DOCUMENTS

2003/0138571 A1    7/2003  Kunishi et al.
2005/0012200 A1    1/2005  Sawada et al.
(Continued)

FOREIGN PATENT DOCUMENTS

CN    1428458 A    7/2003
CN    1723514 A    1/2006
(Continued)

OTHER PUBLICATIONS

Korean Office Action issued in corresponding Korean Patent Application No. 10-2017-0124109, dated May 28, 2018, with English Translation.
(Continued)

*Primary Examiner* — Michael P McFadden
(74) *Attorney, Agent, or Firm* — Morgan, Lewis & Bockius LLP

(57) ABSTRACT

A multilayer ceramic capacitor includes a body including a dielectric layer and first and second internal electrodes, and external electrodes disposed on at least one surface of the body. The external electrodes each includes an electrode layer in contact with the first or second internal electrodes, an intermediate layer disposed on the electrode layer and including a first intermetallic compound, and a conductive resin layer disposed on the intermediate layer and including a plurality of metal particles, a second intermetallic compound and a base resin.

23 Claims, 9 Drawing Sheets

(58) Field of Classification Search
USPC .................................................. 361/306.3
See application file for complete search history.

(56) References Cited

U.S. PATENT DOCUMENTS

| | | |
|---|---|---|
| 2006/0091494 A1 | 5/2006 | Miyamoto et al. |
| 2007/0117338 A1* | 5/2007 | Yamamoto ............... H01G 4/30 438/396 |
| 2008/0239617 A1* | 10/2008 | Motoki ................. H01G 4/232 361/301.4 |
| 2013/0076203 A1 | 3/2013 | Saito et al. |
| 2014/0091432 A1 | 4/2014 | Kawamoto et al. |
| 2014/0321025 A1* | 10/2014 | Saito ........................ C25D 5/12 361/305 |
| 2015/0136463 A1 | 5/2015 | Lee et al. |
| 2015/0279563 A1 | 10/2015 | Otani |
| 2015/0380161 A1 | 12/2015 | Lim et al. |
| 2016/0099110 A1* | 4/2016 | Lee ........................... H01G 4/30 361/301.4 |
| 2016/0351334 A1 | 12/2016 | Takagi et al. |
| 2016/0379758 A1 | 12/2016 | Otani |
| 2017/0032896 A1* | 2/2017 | Otani ..................... H01G 4/232 |
| 2017/0178811 A1 | 6/2017 | Chun et al. |
| 2017/0330689 A1* | 11/2017 | Hatanaka ................ H01G 4/30 |
| 2018/0166215 A1* | 6/2018 | Hamanaka ............... H01G 2/06 |

FOREIGN PATENT DOCUMENTS

| | | |
|---|---|---|
| CN | 1781190 A | 5/2006 |
| CN | 102534505 A | 7/2012 |
| CN | 102893349 A | 1/2013 |
| CN | 103608881 A | 2/2014 |
| CN | 104658756 A | 5/2015 |
| CN | 106206012 A | 12/2016 |
| CN | 106910631 A | 6/2017 |
| EP | 1 571 680 A1 | 9/2005 |
| JP | 2013-110239 A | 6/2013 |
| JP | 2013-110372 A | 6/2013 |
| KR | 10-2010-0110891 A | 10/2010 |
| KR | 10-2015-0086343 A | 7/2015 |
| KR | 10-2016-0001026 A | 1/2016 |
| KR | 10-2017-0000768 A | 1/2017 |
| KR | 10-2017-0074470 A | 6/2017 |

OTHER PUBLICATIONS

Office Action issued in corresponding Chinese Patent Application No. 201810721405.2 dated Dec. 18, 2019, with English translation.

* cited by examiner

MULTILAYER CERAMIC CAPACITOR AND METHOD OF MANUFACTURING THE SAME

CROSS-REFERENCE TO RELATED APPLICATION

This application claims the benefit of priority to Korean Patent Application Nos. 10-2017-0084994, filed on Jul. 4, 2017, and 10-2017-0124109, filed on Sep. 26, 2017 in the Korean Intellectual Property Office, the disclosure of which is incorporated herein by reference in its entirety.

BACKGROUND

1. Field

The present disclosure relates to a multilayer ceramic capacitor and a method of manufacturing the same.

2. Description of Related Art

Multilayer ceramic capacitors (MLCCs), having advantages such as compactness, high capacity, and ease of mountability, are important components used in industries such as the communications industry, the computing industry, the home appliance industry, and the automotive industry, and key passive elements used in various electric, electronic, and information technology devices such as cellular phones, computers, digital TVs, and the like.

In recent years, with increases in the performance and the miniaturization of electronic devices, MLCCs have tended to be reduced in size and to have high capacity, and in this trend, the importance of ensuring high reliability of MLCCs is increasing.

In order to ensure high reliability of MLCCs, a technique of applying a conductive resin layer to external electrodes to prevent the occurrence of cracks due to stress, by absorbing tensile stress generated in a mechanical or thermal environment, has been introduced.

Such a conductive resin layer, formed using a paste containing Cu, glass frit, and a thermoplastic resin, serves to electrically and mechanically bond a sintered electrode layer and a plating layer of an external electrode of an MLCC and serves to protect the MLCC from mechanical and thermal stresses depending on a process temperature and a bending impact of a circuit board when the MLCC is mounted on the circuit board.

However, in the case of using the paste containing Cu, glass frit, and a thermoplastic resin, physical properties regarding a reliability item may be changed due to a bending impact, a thermal impact, or the absorption of moisture or chlorinated water, and the like, based on basic physical properties of a material.

That is, in the case of using such a paste containing Cu, glass frit, and a thermoplastic resin, residual stress may be present in a capacitor, bending impacts may be transmitted to a ceramic body, and chemical resistance properties may be degraded according to components of the glass frit.

SUMMARY

An aspect of the present disclosure may provide a multilayer ceramic capacitor having excellent reliability in terms of moisture resistance, low equivalent series resistance (ESR), and excellent resistance to mechanical stress, and a method of manufacturing the same.

According to an aspect of the present disclosure, a multilayer ceramic capacitor includes: a body including a dielectric layer and first and second internal electrodes; and external electrodes disposed on at least one surface of the body. The external electrodes each include: an electrode layer in contact with the first or second internal electrodes; an intermediate layer disposed on the electrode layer and including a first intermetallic compound; and a conductive resin layer disposed on the intermediate layer and including a plurality of metal particles, a second intermetallic compound and a base resin.

According to another aspect of the present disclosure, a method of manufacturing a multilayer ceramic capacitor includes: stacking a plurality of green sheets on which an internal electrode is printed to prepare a multilayer body; sintering the multilayer body to prepare a sintered body; forming an electrode layer electrically connected to one end of the internal electrode and covering one surface of the sintered body; and applying a paste having a low melting point to the electrode layer, drying the paste, and curing the dried paste through a heat treatment to form an intermediate layer and a conductive resin layer.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will be described in detail with reference to the accompanying drawings.

Figure 1:
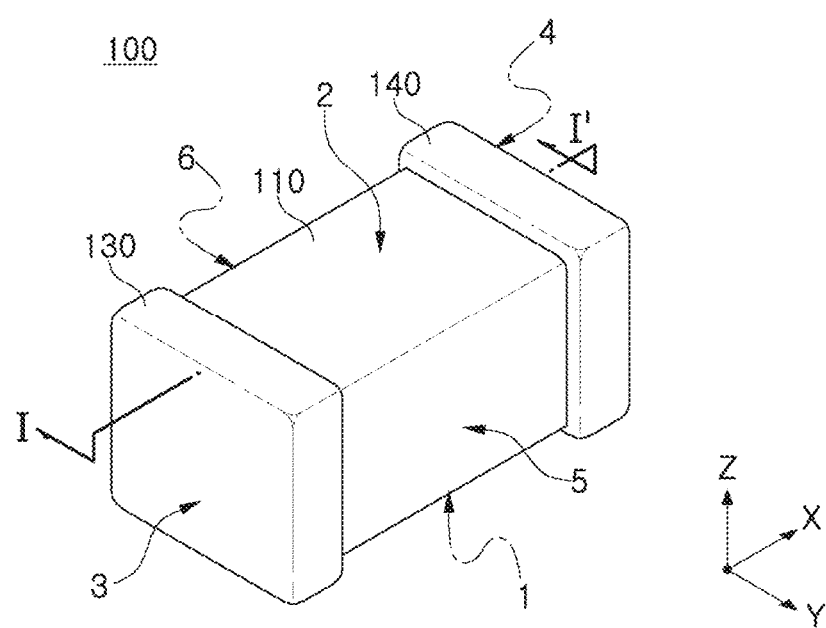
FIG. 1 is a perspective view schematically illustrating a multilayer ceramic capacitor (MLCC) according to an exemplary embodiment in the present disclosure.
Figure 2:
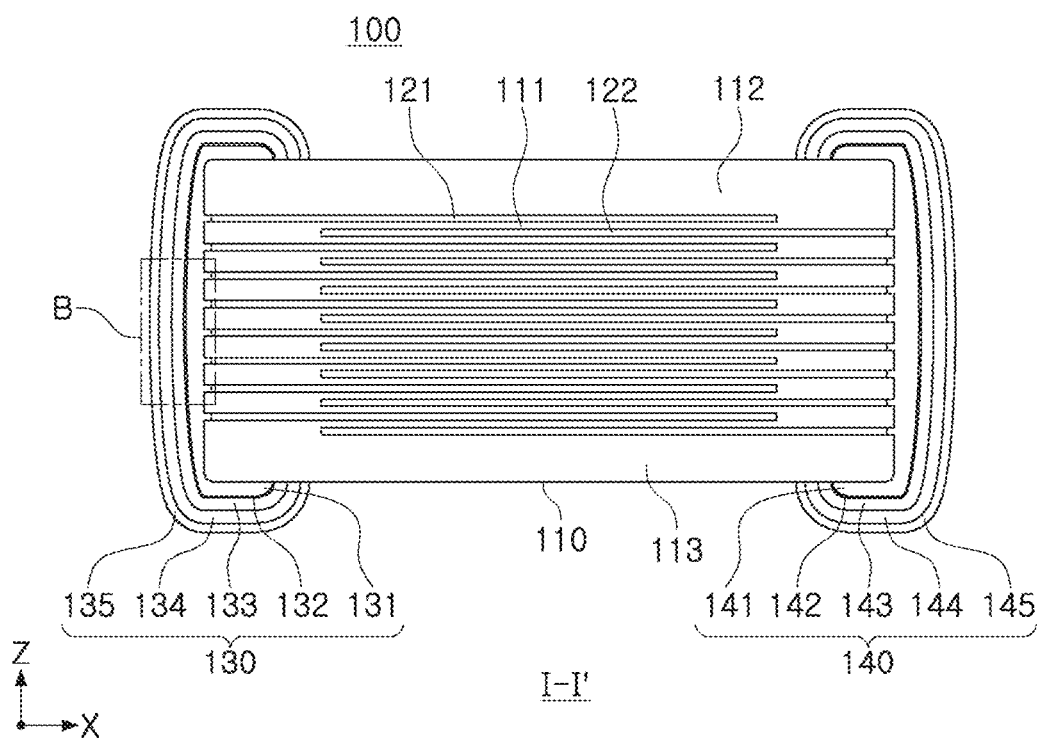
FIG. 2 is a cross-sectional view of the MLCC of FIG. 1, taken along line I-I'.

FIG. 1 is a perspective view schematically illustrating a multilayer ceramic capacitor (MLCC) according to an exemplary embodiment in the present disclosure. FIG. 2 is a cross-sectional view of the MLCC of FIG. 1, taken along line I-I'.

Referring to FIGS. 1 and 2, an MLCC 100 according to an exemplary embodiment in the present disclosure includes a body 110 and first and second external electrodes 130 and 140.

The body 110 may include an active region serving as a part contributing to capacitance formation of the capacitor and upper and lower covers 112 and 113 formed, as upper and lower marginal portions, respectively on upper and lower surfaces of the active region.

In an exemplary embodiment in the present disclosure, the body 110 may have a substantially hexahedral shape but is not limited thereto.

That is, the body 110 may have a substantially hexahedral shape, although it may not be a perfectly hexahedral shape due to a thickness difference based on an arrangement of internal electrodes and polishing of the corners.

In order to clarify the exemplary embodiment in the present disclosure, directions of a hexahedron may be defined as follows: In the figure, the X direction is a first direction or a length direction, the Y direction is a second direction or a width direction, the Z direction is a third direction or a thickness direction or a stacking direction.

In the body 110, both surfaces opposing each other in the Z direction are defined as first and second surfaces 1 and 2, both surfaces connected to the first and second surfaces 1 and 2 and opposing each other in the X direction are defined as third and fourth surfaces 3 and 4, and both surfaces connected to the first and second surfaces 1 and 2 and connected to the third and fourth surfaces 3 and 4 and opposing each other in the Y direction are defined as fifth and sixth surfaces 5 and 6, respectively. Here, the first surface 1 may be a mounting surface.

The active region may have a structure including a plurality of dielectric layers 111 and a plurality of first and second internal electrodes 121 and 122 alternately stacked with the dielectric layer 111 sandwiched therebetween.

The dielectric layer 111 may include ceramic powder having a high dielectric constant, e.g., a barium titanate ($BaTiO_3$)-based or a strontium titanate ($SrTiO_3$)-based powder but is not limited thereto.

A thickness of the dielectric layer 111 may be arbitrarily changed in accordance with a capacity design of the MLCC 100. The thickness of one dielectric layer may be 0.1 to 10 μm after sintering in consideration of a size and capacity of the body 110 but is not limited thereto.

The first and second internal electrodes 121 and 122 may be disposed to face each other with the dielectric layer 111 sandwiched therebetween.

The first and second internal electrodes 121 and 122, a pair of electrodes having opposite polarities, may be formed by printing a conductive paste containing a conductive metal to have a predetermined thickness on the dielectric layer 111 such that the first and second internal electrodes 121 and 122 are alternately exposed to the third and fourth surfaces 3 and 4 of the body 110 with the dielectric layer 111 sandwiched therebetween in a stacking direction of the dielectric layer 111. The first and second internal electrodes 121 and 122 may be electrically insulated from each other by the dielectric layer 111 disposed therebetween.

Here, the internal electrodes 121 and 122 may be arranged within the body such that the first and second internal electrodes 121 and 122 are spaced apart from the third and fourth surfaces 3 and 4 of the body at a certain interval and alternately exposed to the third and fourth surfaces 3 and 4 due to a difference in shrinkage between the dielectric layer and the internal electrodes during sintering after stacking.

The first and second internal electrodes 121 and 122 may be electrically connected to the first and second external electrodes 130 and 140, respectively, through the portions by which the first and second internal electrodes 121 and 122 are spaced apart from the third and fourth surfaces 3 and 4 at the predetermined interval (hereinafter, referred to as "certain separating portions") and through electrode layers 131 and 141 respectively formed on the third and fourth surfaces 3 and 4 of the body.

Accordingly, when a voltage is applied to the first and second external electrodes 130 and 140, charges are accumulated between the first and second internal electrodes 121 and 122 opposing each other and, here, capacitance of the MLCC 100 is proportional to the area of a region in which the first and second internal electrodes 121 and 122 overlap each other.

A thickness of the first and second internal electrodes 121 and 122 may be determined according to applications. For example, the thickness of the first and second internal electrodes 121 and 122 may be determined to fall within a range of 0.2 to 1.0 μm in consideration of a size and capacity of the ceramic body 110 but is not limited thereto.

The conductive metal included in the first and second internal electrodes 121 and 122 may be nickel (Ni), copper (Cu), palladium (Pd), or alloys thereof but is not limited thereto.

The upper and lower covers 112 and 113 may have the same material and configuration as those of the dielectric layer 111 of the active region, except that they do not include internal electrodes.

That is, the upper and lower covers 112 and 113 may be formed by stacking a single dielectric layer or two or more dielectric layers on upper and lower surfaces of the active region in the Z direction, respectively. The upper and lower covers 112 and 113 may basically serve to prevent damage to the first and second internal electrodes 121 and 122 due to physical or chemical stress.

The first and second external electrodes 130 and 140 may include the electrode layers 131 and 141, intermediate layers 132 and 142, conductive resin layers 133 and 143, first plating layers 134 and 144, and second plating layers 135 and 145, respectively.

The first plating layers 134 and 144 maybe nickel plating layers, and the second plating layers 135 and 145 may be tin plating layers.

The electrode layers 131 and 141 serve to mechanically bond the body and the external electrodes and electrically and mechanically bond the internal electrodes and the external electrodes.

Figure 5:
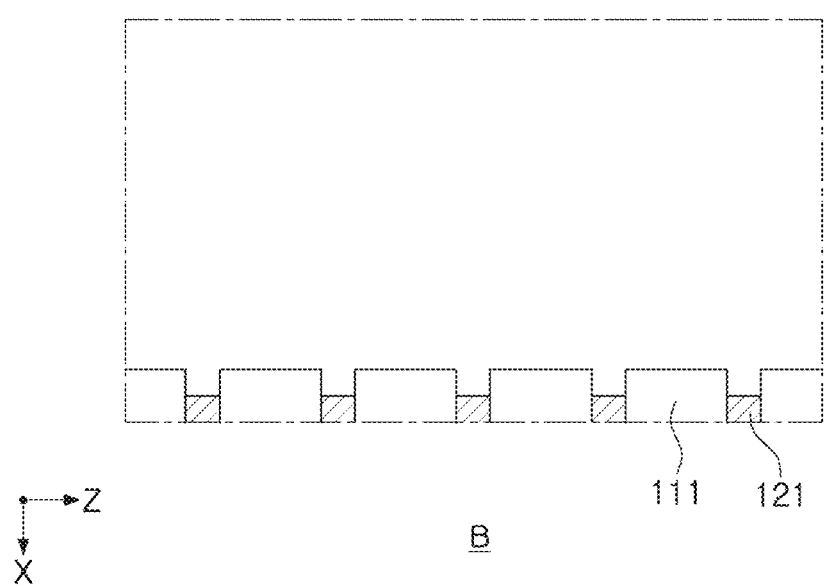
FIG. 5 is a cross-sectional view illustrating the region B after sintering a multilayer body.

As illustrated in FIG. 5, the internal electrodes 121 and 122 may be arranged within the body such that the internal electrodes 121 and 122 are spaced apart from the third and fourth surfaces 3 and 4 of the body at a certain interval and alternately exposed to the third and fourth surfaces 3 and 4 due to a difference in shrinkage between the dielectric layer and the internal electrodes 121 and 122 during sintering after stacking. When the internal electrodes 121 and 122 are formed within the body such that they are spaced apart from the third and fourth surfaces 3 and 4 of the body at the predetermined interval and are alternately exposed, electrical connectivity between the internal electrodes 121 and 122 and the external electrodes 130 and 140 may be deteriorated.

Figure 6:
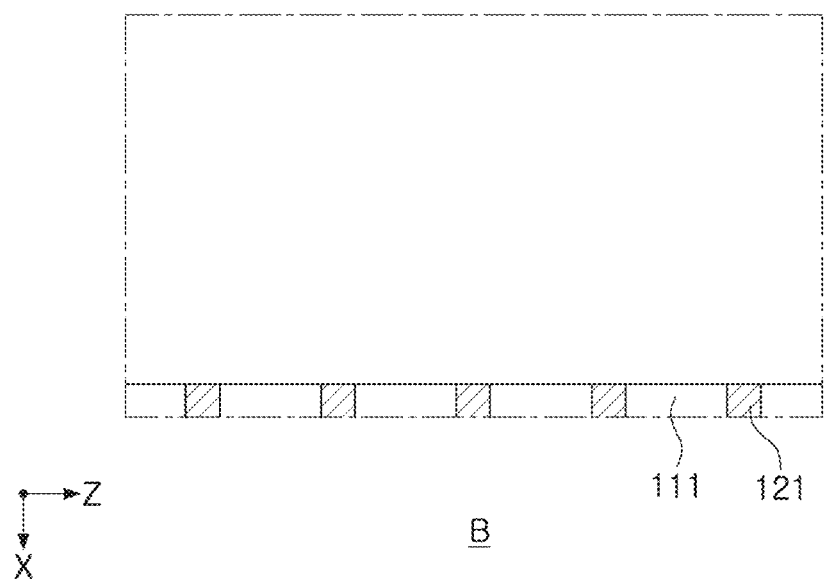
FIG. 6 is a cross-sectional view of a sintered multilayer body after protruding portions thereof illustrated in FIG. 5 are removed using a sandblasting method.

The related art solves this problem by adding a step of removing the protruding dielectric layer using a sandblasting method, or the like, as illustrated in FIG. 6.

Figure 7:
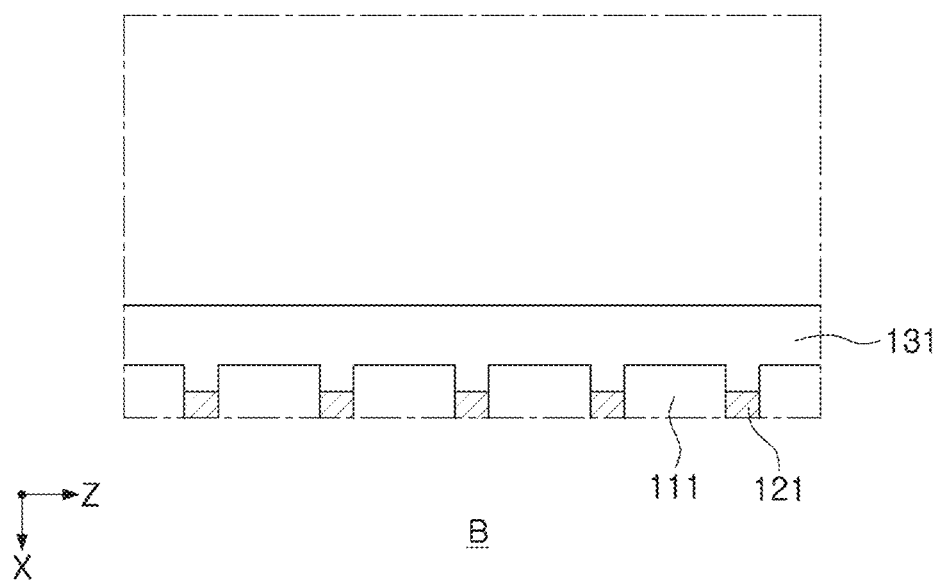
FIG. 7 is a cross-sectional view of a multilayer body after an electrode layer is formed by performing electroless plating on the sintered multilayer body illustrated in FIG. 5.

In contrast, in the present disclosure, as illustrated in FIG. 7, since the electrode layers 131 and 141 are formed on the certain separating portions and on the third and fourth surfaces 3 and 4, it is not necessary to remove the protruding dielectric layer using the sandblasting method.

The method of forming the electrode layers 131 and 141 is not limited as long as the electrode layer may be formed on the certain separating portions and on the third and fourth surfaces 3 and 4 of the body. For example, the electrode layers 131 and 141 may be electroless plating layers or sputtered layers formed using an electroless plating method or a sputtering method capable of forming an electrode layer having high density, high corrosion resistance, and a uniform thickness.

In the case of using the electroless plating method, the electrode layers 131 and 141 may be formed in the dielectric layer portion of the body and may also be easily formed in the certain separating portions to cover one surface of the body.

In detail, in the case of using the electroless plating method, electroless plating using sodium borohydride and Ni or electroless plating using sodium hypophosphite and Ni may be used. However, when the component P is contained in a large amount, formation of a first intermetallic compound forming intermediate layers 132 and 142 may be slowed or interrupted, and therefore, it is more preferable to use the electroless plating method using sodium borohydride and Ni.

When the electroless plating method using sodium borohydride and Ni is used, the electrode layers 131 and 141 include Ni and B.

A thickness of the electrode layer is not limited but may be within a range from 0.5 to 5 μm.

The electrode layers 131 and 132 may extend from the third and fourth surfaces 3 and 4 of the body 110 to portions of the first and second surfaces 1 and 2 of the body 110, respectively.

Also, the electrode layers 131 and 132 may extend from the third and fourth surfaces 3 and 4 of the body 110 to portions of the fifth and sixth surfaces 5 and 6 of the body, respectively.

Figure 8:
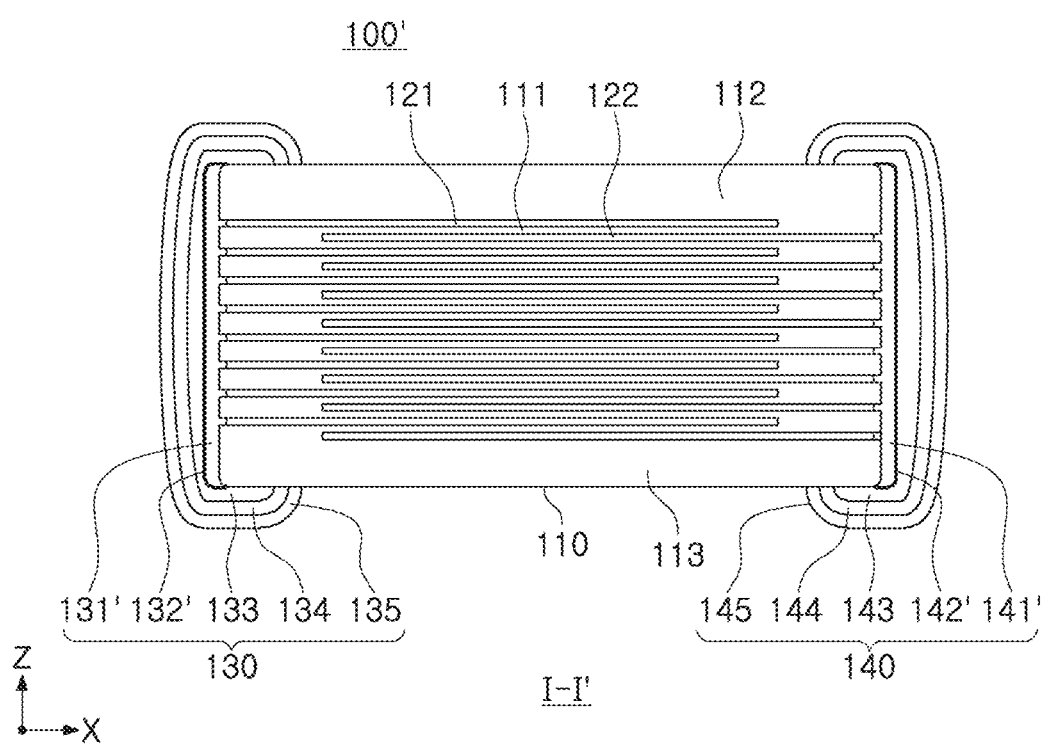
FIG. 8 is a cross-sectional view schematically illustrating an MLCC according to another exemplary embodiment in the present disclosure.

In another exemplary embodiment, as illustrated in FIG. 8, the first and second external electrodes 130 and 140 of an MLCC 100' may be formed such that electrode layers 131' and 141' are formed only on the third and fourth surfaces 3 and 4, without extending to the first and second surfaces 1 and 2 of the body 110, respectively.

In this case, bending strength and ESR of the MLCC 100' may further be improved.

Intermediate layers 132' and 142' include a first intermetallic compound and serve to improve reliability of humidity resistance and electrical connectivity. The intermediate layers 132' and 142' may be disposed to cover the electrode layers 131' and 141'. The intermediate layers 132' and 142' may consist of the first intermetallic compound.

In the related art, after the protruding dielectric layer is removed, a conductive paste is applied to the third and fourth surfaces 3 and 4 and sintered to form external electrodes. When sintered, metal particles contained in the internal electrodes and metal particles contained in the conductive paste are mutually spread to form an intermetallic compound at a portion where the conductive paste and the internal electrodes abut on each other to secure electrical connectivity. As illustrated in FIG. 5, when the dielectric layer has a protruding shape due to the difference in shrinkage between the dielectric layer and the internal electrodes in the course of sintering after stacking, contact between the conductive paste and the internal electrodes may be deteriorated so the intermetallic compound is not readily formed, and thus, the step of removing the protruding dielectric layer using the sandblasting method, or the like, is required. The electrode layers 131 and 141 may be in direct contact with the first and second external electrodes 130 and 140, respectively.

However, in the present disclosure, since the electrode layers 131 and 141 are formed and the external electrodes 130 and 140 are formed on the electrode layers 131 and 141 by applying a paste having a low melting point to the electrode layers 131 and 141 and sintering the same, eliminating the necessity to remove the protruding dielectric layer using a sandblasting method. Also, since the metal particles included in the electrode layers 131 and 141 and the metal particles having a low melting point included in the paste are mutually spread to form the first intermetallic compound, and the first intermetallic compound is formed as a layer between the electrode layers 131 and 141 and the conductive resin layers 133 and 143, reliability of moisture resistance and electrical connectivity may be enhanced.

Here, the first intermetallic compound may be $Ni_3Sn_4$. That is, it may be $Ni_3Sn_4$ formed as Ni, a metal particle contained in the electrode layers 131 and 141, and Sn, a metal particle having a low melting point contained in the paste, are bonded.

Figure 3:
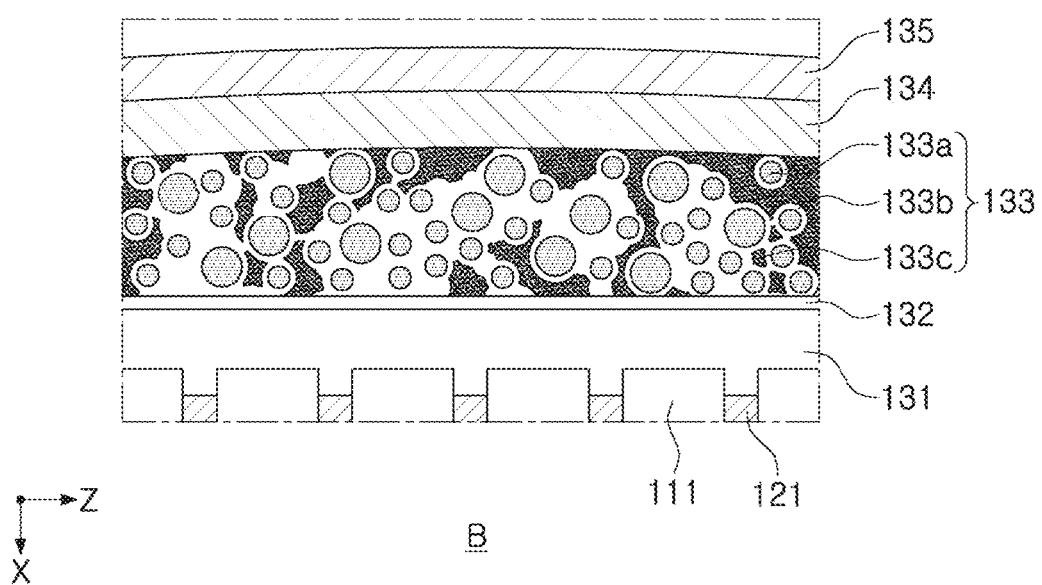
FIG. 3 is an enlarged cross-sectional view of a region 'B' of FIG. 2.
Figure 4:
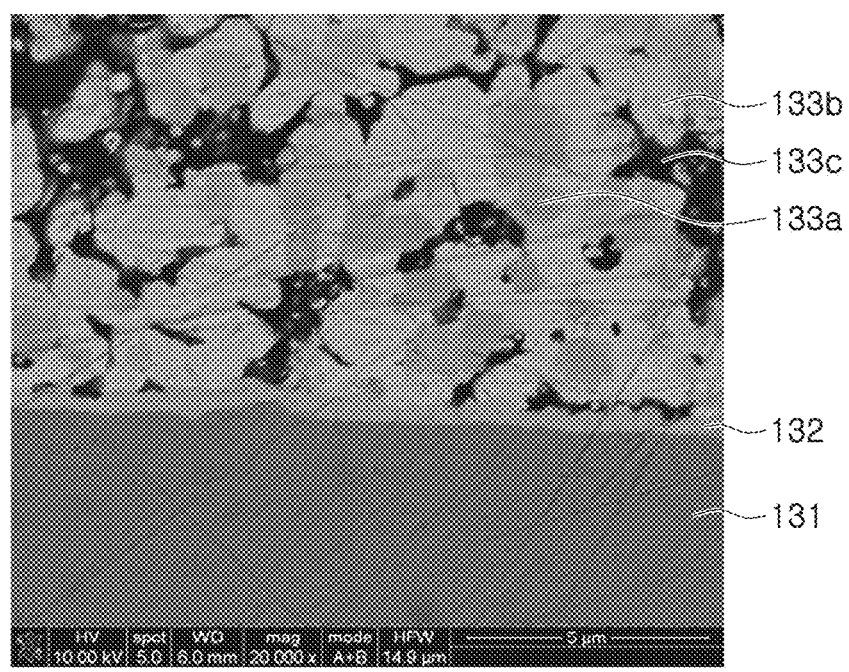
FIG. 4 is a photograph of a cross-section in the vicinity of the region 'B' of an MLCC according to the exemplary embodiment in the present disclosure, taken by a microscope.

FIG. 3 is an enlarged cross-sectional view of a region B in FIG. 2.

The region B is a portion of the first external electrode 130 illustrated to be enlarged. The first external electrode 130 is electrically connected to the first internal electrode 121 and the second external electrode 140 is electrically connected to the second internal electrode 122 and the first external electrode 130 and the second external electrode 140 are similar in configuration. Thus, only the first external electrode 130 will be described but the same description may also be applied to the second external electrode 140.

The conductive resin layer 133 is disposed on the intermediate layer 132 and includes a plurality of metal particles 133a, a second intermetallic compound 133b and a base resin 133c. The second intermetallic compound 133b may enclose at least a portion of the plurality of metal particles 133a. The conductive resin layer 133 may serve to electrically and mechanically bond the intermediate layer 132 and a first plating layer, and serve to absorb tensile stress generated in a mechanical or thermal environment when the MLCC is mounted on a board to prevent occurrence of cracks and protect the MLCC from a bending impact of the board.

The metal particles 133a may include at least one of silver (Ag) and copper (Cu) and may preferably be formed of Ag.

The second intermetallic compound 133b may enclose the plurality of metal particles 133a to connect the metal particles 133a to each other in a molten state, whereby stress inside the body 110 may be minimized and high temperature load and moisture resistance load characteristics may be improved.

Here, the second intermetallic compound 133b may include a metal having a melting point lower than a temperature for curing the base resin 133c.

That is, since the second intermetallic compound 133b contains a metal having a melting point lower than the temperature for curing the base resin 133c, the metal having a melting point lower than the temperature for curing the base resin 133c is melted in the course of drying and curing and forms the second intermetallic compound 133b together with some of the metal particles to enclose the metal particles 133a. Here, the second intermetallic compound 133b may preferably contain a metal having a melting point equal to or lower than 300° C.

For example, the second intermetallic compound 133b may contain Sn having a melting point of 213 to 220° C. In the course of drying and curing, Sn is melted and the molten Sn wets the metal particles having a high melting point such as Ag or Cu according to a capillary phenomenon and reacts with some of the Ag or Cu metal particles to form the second intermetallic compound 133b such as $Ag_3Sn$, $Cu_6Sn_5$, and $Cu_3Sn$. Ag or Cu which has not participated in the reaction remains in the form of metal particles 133a as illustrated in FIG. 3.

The base resin 133c may include a thermosetting resin having electrical insulation properties.

Here, the thermosetting resin may be, for example, an epoxy resin but is not limited thereto.

The base resin 133c serves to mechanically bond the intermediate layer 132 and the first plating layer 134.

In the case of forming a conductive resin layer using a paste containing Cu, glass frit, and a thermoplastic resin as in the related art, the glass frit component helps to form an alloy between Cu particles and Ni internal electrodes and serves as a binder to perform sealing. That is, when a temperature at which the glass frit component melts, a sintering temperature of Cu, and an alloy formation temperature between Cu and Ni are similar, the Cu particles are sintered to proceed with densification, and as an alloy of Cu and Ni is formed, connection to the internal electrodes is made through metal binding, and the glass frit component fills an empty space. However, the alloy formation temperature is 700 to 900° C. and residual stress remains to cause a radiation crack, or the like. In addition, chemical resistance properties with respect to a plating solution may be weakened depending on the glass frit component.

In contrast, in the present disclosure, since the conductive resin layer is formed using a low melting-point paste including a metal having a melting point lower than the curing temperature of the base resin 133c and through epoxy curing, residual stress is less generated, and since a volume is reduced as the second intermetallic compound is formed, generation of residual stress may be more effectively restrained, relative to the alloy of Cu—Ni expanded in volume.

Also, since the first intermetallic compound, as an intermediate layer, is formed in a layer form between the electrode layer and the conductive resin layer in the conductive resin layer formation process, reliability of moisture resistance and electrical connectivity are improved.

Figure 9:
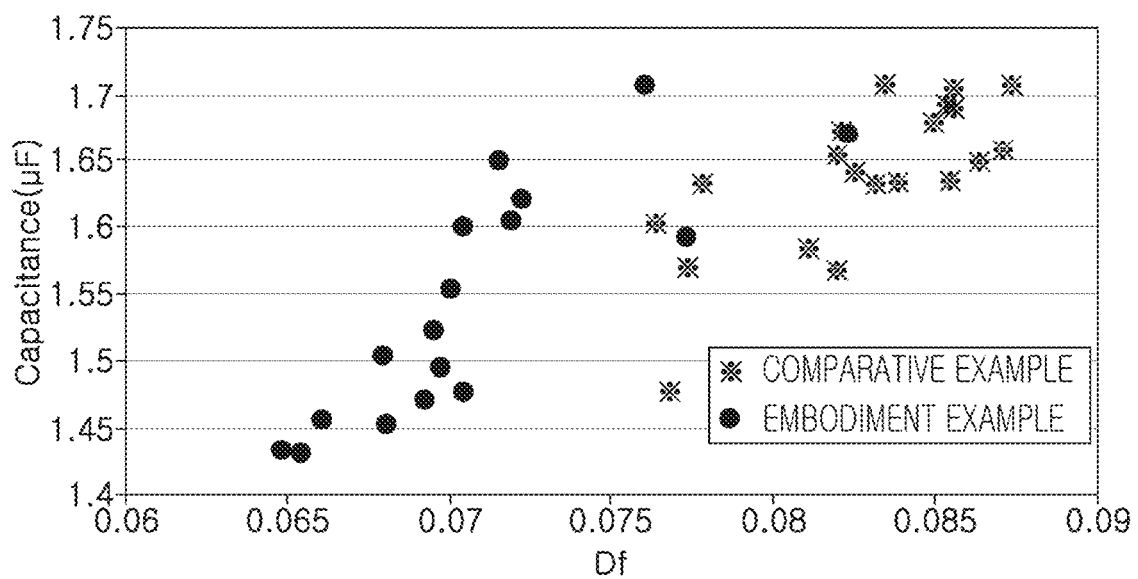
FIG. 9 is a graph illustrating measured capacitance and dissipation factor (Df) values of an embodiment example and a comparative example.

FIG. 9 is a graph illustrating measured capacitance (μF) and dissipation factor (Df) values of comparative examples in which a conductive resin layer was formed using a paste including Cu, glass frit, and a thermoplastic resin according to the related art and embodiment examples including the electrode layers 131 and 141, the intermediate layers 132 and 142, and the conductive resin layers 133 and 143 according to an exemplary embodiment in the present disclosure. It can be seen that the embodiment examples have lower Df values to reduce energy loss, compared with the comparative examples.

Hereinafter, a method of manufacturing an MLCC according to an exemplary embodiment in the present disclosure will be described in detail. However, the present disclosure is not limited thereto and the same descriptions of the method of manufacturing the MLCC of the present exemplary embodiment as those of the MLCC described above will be omitted.

In the method of manufacturing an MLCC according to the present exemplary embodiment, first, a slurry formed to include powder such as barium titanate ($BaTiO_3$) is applied to a carrier film and dried to prepare a plurality of ceramic green sheets.

As for the ceramic green sheet, a slurry is prepared by mixing ceramic powder, a binder, and a solvent and subsequently treated using a doctor blading method, or the like, to form a sheet having a thickness of several micrometers (μm).

Next, a conductive paste for an internal electrode including a conductive metal such as nickel powder, or the like, is applied to the green sheet by a screen printing method, or the like, to form an internal electrode.

Thereafter, a plurality of green sheets on which the internal electrode is printed are stacked to form a multilayer body. Here, a cover may be formed on upper and lower surfaces of the multilayer body by stacking a plurality of green sheets on which an internal electrode is not printed.

Thereafter, the multilayer body is sintered to form a sintered body, and electrode layers are formed on third and fourth surfaces of the body, respectively, so as to be electrically connected to the first and second internal electrodes.

The body includes the dielectric layers, the internal electrodes, and the cover. The dielectric layers are formed by sintering a green sheet on which the internal electrode is printed, and the cover is formed by sintering a green sheet on which the internal electrode is not printed.

The internal electrodes may be formed of first and second internal electrodes having opposite polarities.

As described above, according to the present disclosure, since there is no need to remove the dielectric layer protruding due to the difference in shrinkage between the dielectric layer and the internal electrode using the sand-blasting method, or the like, the electrode layer may be formed immediately after the body is prepared. The method of forming the electrode layer is not limited as long as it is possible to form the electrode layer in the portions spaced apart from the third and fourth surfaces of the body formed due to the difference in shrinkage between the dielectric layer and the internal electrodes and on the third and fourth surfaces of the body. For example, the electrode layer may be formed using an electroless plating method or a sputtering method capable of forming an electrode layer which is dense, has high corrosion resistance, and has a uniform thickness.

In detail, in the case of using the electroless plating method, electroless plating using sodium borohydride and Ni or electroless plating using sodium hypophosphite and Ni may be used. However, when the component P is contained in a large amount, formation of a first intermetallic compound forming intermediate layers may be slowed or interrupted, and therefore, it is more preferable to use the electroless plating method using sodium borohydride and Ni.

Thereafter, a paste having a low melting point is applied to the electrode layer, dried, and subsequently thermally treated to be cured to form an intermediate layer and a conductive resin layer.

The paste having a low melting point may include metal particles, a thermosetting resin, and a low melting point metal having a melting point lower than that of the thermosetting resin. For example, the paste may be prepared by mixing Ag powder, Sn-based solder powder, and a thermosetting resin and then dispersing the mixture using a 3-roll mill. The Sn-based solder powder may include at least one selected from among Sn, $Sn_{96.5}Ag_{3.0}Cu_{0.5}$, $Sn_{42}Bi_{58}$, and $Sn_{72}Bi_{28}$, and a particle size of Ag contained in the Ag powder may be 0.5 to 3 μm but is not limited thereto.

The low melting point paste may be applied to an outer side of the electrode layer and dried and cured to form the intermediate layer and the conductive resin layer.

The thermosetting resin may include, for example, an epoxy resin but is not limited thereto. For example, the thermosetting resin may be a resin in a liquid phase at room temperature due to a low molecular weight, among a bisphenol A resin, a glycol epoxy resin, a Novolac epoxy resin and derivatives thereof.

The method may further include forming a first plating layer and a second plating layer on the conductive resin layer.

For example, a nickel plating layer as a first plating layer may be formed on the conductive resin layer, and a tin plating layer as a second plating layer may be formed on the nickel plating layer.

As set forth above, according to exemplary embodiments of the present disclosure, the structure in which the electrode layer, the intermediate layer, and the conductive resin layer are sequentially stacked may replace the sandblasting method, reliability of moisture resistance may be improved, ESR may be lowered, and resistance to mechanical stress such as bending strength, and the like, and chemical resistance properties may be enhanced.

While exemplary embodiments have been shown and described above, it will be apparent to those skilled in the art that modifications and variations could be made without departing from the scope of the present disclosure as defined by the appended claims.

What is claimed is:

1. A multilayer ceramic capacitor comprising: a body including a dielectric layer and first and second internal electrodes; and external electrodes disposed on at least one surface of the body, wherein the external electrodes each include: an electrode layer in contact with the first or second internal electrode; an intermediate layer disposed on the electrode layer and including a first intermetallic compound; and a conductive resin layer disposed on the intermediate layer and contacting only the intermediate layer, from among the electrode and intermediate layers, and including a plurality of metal particles, a second intermetallic compound fully enclosing at least one metal particle of the plurality of metal particles, and a base resin.

2. The multilayer ceramic capacitor of claim 1, wherein the electrode layer is disposed to cover one surface of the body.

3. The multilayer ceramic capacitor of claim 1, wherein the electrode layer is an electroless plating layer.

4. The multilayer ceramic capacitor of claim 1, wherein the electrode layer is a sputtered layer.

5. The multilayer ceramic capacitor of claim 1, wherein the electrode layer includes nickel (Ni) and boron (B).

6. The multilayer ceramic capacitor of claim 1, wherein the electrode layer includes first surfaces in contact with the first or second internal electrode or body, and the intermediate layer is disposed to cover an entirety of second surfaces of the electrode layer other than the first surfaces.

7. The multilayer ceramic capacitor of claim 1, wherein the intermediate layer is the first intermetallic compound formed in a layer form.

8. The multilayer ceramic capacitor of claim 1, wherein the first intermetallic compound includes nickel (Ni) and tin (Sn).

9. The multilayer ceramic capacitor of claim 8, wherein the first intermetallic compound is $Ni_3Sn_4$.

10. The multilayer ceramic capacitor of claim 1, wherein the plurality of metal particles include at least one of silver (Ag) and copper (Cu), and
the second intermetallic compound includes at least one of $Ag_3Sn$, $Cu_6Sn_5$, and $Cu_3Sn$.

11. The multilayer ceramic capacitor of claim 1, further comprising:
a first plating layer and a second plating layer disposed on the conductive resin layer.

12. The multilayer ceramic capacitor of claim 1, wherein the body includes first and second surfaces opposing each other, third and fourth surfaces connected to the first and second surfaces and opposing each other, and fifth and sixth surfaces connected to the first and second surfaces, connected to the third and fourth surfaces, and opposing each other,
the first and second internal electrodes are each spaced apart from both the third and fourth surfaces of the body and are respectively exposed to the third and fourth surfaces, and
the electrode layers are formed in portions by which the first internal electrode is spaced apart from the third surface of the body and on the third surface of the body to be connected to the first internal electrode, and in portions by which the second internal electrode is spaced apart from the fourth surface of the body and on the fourth surface of the body to be connected to the second internal electrode.

13. The multilayer ceramic capacitor of claim 12, wherein the electrode layers extend from the third and fourth surfaces of the body to portions of the first and second surfaces of the body.

14. The multilayer ceramic capacitor of claim 1, wherein the electrode layer is in direct contact with the first or second internal electrode.

15. An electronic component comprising:
a body including a dielectric layer and an internal electrode; and
an external electrode disposed on a surface of the body, wherein the external electrode includes:
an intermediate layer including a first intermetallic compound; and
a conductive resin layer disposed on the intermediate layer and including a plurality of metal particles, a second intermetallic compound, and a base resin,
wherein the first intermetallic compound includes a metal contained in the second intermetallic compound, and
the second intermetallic compound is different from the first intermetallic compound and includes a metal contained in the plurality of metal particles.

16. The electronic component of claim 15, wherein the second intermetallic compound encloses at least a portion of the plurality of metal particles.

17. The electronic component of claim 15, further comprising an electrode layer in contact with the internal electrode, wherein the intermediate layer is disposed on the electrode layer.

18. The electronic component of claim 17, wherein the internal electrode is exposed to the surface of the body having the external electrode disposed thereon and is spaced apart from the surface, and
the electrode layer extends into the body from the surface of the body having the external electrode disposed thereon to contact the internal electrode that is spaced apart from the surface.

19. The electronic component of claim 15, wherein the first intermetallic compound includes nickel and tin,
the plurality of metal particles include at least one of silver (Ag) and copper (Cu), and
the second intermetallic compound includes at least one of $Ag_3Sn$, $Cu_6Sn_5$, and $Cu_3Sn$.

20. The electronic component of claim 15, wherein the second intermetallic compound of the conductive resin layer includes a metal other than the metal contained in the plurality of metal particles and having a melting point lower than a curing temperature of the base resin.

21. A multilayer ceramic capacitor comprising: a body including a dielectric layer and first and second internal electrodes; and external electrodes disposed on at least one surface of the body, wherein each of the first and second internal electrodes is spaced apart from the at least one surface of the body, and wherein the external electrodes each include: an electrode layer extending in a portion of the body by which the first or second internal electrode is spaced apart from the at least one surface of the body to be in contact with the first or second internal electrode; an intermediate layer disposed on the electrode layer and including a first intermetallic compound; and a conductive resin layer disposed on the intermediate layer and contacting only the intermediate layer, from among the electrode and intermediate layers, and including a plurality of metal particles, a second intermetallic compound with a composition different from the first intermetallic compound and including a metal contained in the plurality of metal particles, and a base resin.

22. The multilayer ceramic capacitor of claim 21, wherein the first intermetallic compound includes nickel (Ni) and tin (Sn).

23. The multilayer ceramic capacitor of claim 21, wherein the plurality of metal particles include at least one of silver (Ag) and copper (Cu), and the second intermetallic compound includes at least one of $Ag_3Sn$, $Cu_6Sn_5$, and $Cu_3Sn$.

* * * * *